United States Patent
Ertimo et al.

(10) Patent No.: US 12,114,251 B2
(45) Date of Patent: Oct. 8, 2024

(54) OVERSHOOTER DETECTION IN A RADIO NETWORK BASED ON RESTRICTION OF DATA TRAFFIC

(71) Applicant: Elisa Oyj, Helsinki (FI)

(72) Inventors: Riku Ertimo, Helsinki (FI); Veijo Höykinpuro, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 18/696,189

(22) PCT Filed: Nov. 21, 2023

(86) PCT No.: PCT/FI2023/050640
§ 371 (c)(1),
(2) Date: Mar. 27, 2024

(87) PCT Pub. No.: WO2024/110693
PCT Pub. Date: May 30, 2024

(65) Prior Publication Data
US 2024/0276348 A1 Aug. 15, 2024

(51) Int. Cl.
*H04W 48/06* (2009.01)
*H04W 28/02* (2009.01)
(Continued)

(52) U.S. Cl.
CPC ....... *H04W 48/06* (2013.01); *H04W 28/0289* (2013.01); *H04W 28/06* (2013.01); *H04W 48/08* (2013.01); *H04W 72/0453* (2013.01)

(58) Field of Classification Search
None
See application file for complete search history.

(56) References Cited

U.S. PATENT DOCUMENTS 8,976,749 B2    3/2015    Sun et al.
10,778,697 B2 *   9/2020    Cho ............... H04W 76/20
(Continued)

FOREIGN PATENT DOCUMENTS

EP    2645808 A1    10/2013
EP    3422769 B1    1/2019
(Continued)

OTHER PUBLICATIONS

Search report of the priority patent application No. 20226052 dated May 30, 2023 (2 pages).
(Continued)

*Primary Examiner* — Hong S Cho
(74) *Attorney, Agent, or Firm* — Christopher R. Carroll; The Small Patent Law Group LLC

(57) ABSTRACT

Example embodiments may relate to detection of overshooting cells in a radio network. A computer-implemented method may comprise: communicating data traffic via a first cell of a first access node of a communication network, wherein a sector of the first access node comprises the first cell and a second cell of the first access node; restricting amount of data traffic communicated via the first cell; and determining that a third cell of a second access node is overshooting, in response to determining, after restricting the amount of data traffic communicated via the first cell, that at least part of the data traffic is communicated via the third cell and not via the second cell.

20 Claims, 7 Drawing Sheets

(51) Int. Cl.
*H04W 28/06* (2009.01)
*H04W 48/08* (2009.01)
*H04W 72/0453* (2023.01)

(56) References Cited

U.S. PATENT DOCUMENTS

| | | | |
|---|---|---|---|
| 11,388,650 B2* | 7/2022 | Li | H04W 28/10 |
| 11,546,818 B2* | 1/2023 | Fujishiro | H04W 36/08 |
| 2010/0278143 A1 | 11/2010 | Chun et al. | |
| 2014/0162682 A1 | 6/2014 | Tafreshi et al. | |
| 2015/0141024 A1* | 5/2015 | Kapnadak | H04W 16/18 |
| | | | 455/446 |
| 2015/0141027 A1* | 5/2015 | Tsui | H04W 24/02 |
| | | | 455/452.1 |
| 2015/0148050 A1 | 5/2015 | Siomina et al. | |
| 2018/0368051 A1 | 12/2018 | Barillaro et al. | |
| 2021/0314783 A1 | 10/2021 | Yoo | |
| 2022/0240123 A1* | 7/2022 | Zeng | H04W 28/0983 |

FOREIGN PATENT DOCUMENTS

| | | | |
|---|---|---|---|
| EP | 3541107 A1 | 9/2019 | |
| WO | 2016063365 A1 | 4/2016 | |
| WO | 2017170202 A1 | 10/2017 | |

OTHER PUBLICATIONS

Office action of the priority patent application No. 20226052 dated May 30, 2023 (12 pages).

Office action (Approval for acceptance) of the priority patent application No. 20226052 dated Feb. 15, 2024 (11 pages).

International Search Report for PCT/FI2023/050640 (5 pages).

Witten Opinion of ISA for PCT/FI2023/050640 (11 pages).

3GPP TS 36.300 V17.2.0 (Sep. 2022). 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17). [online], Sep. 30, 2022, [retrieved on May 24, 2023]. Retrieved from <https://www.3gpp.org/ftp/Specs/archive/36_series/36.300/36300-h20.zip> (401 pages).

Buenestado, V. et al. Self-tuning of Remote Electrical Tilts Based on Call Traces for Coverage and Capacity Optimization in LTE. In: IEEE Transactions on Vehicular Technology. IEEE [online], May 2017, vol. 66, No. 5, pp. 4315-4326, [retrieved on May 23, 2023]. Retrieved from <https://ieeexplore.ieee.org/abstract/document/7558145>, <DOI:10.1109/TVT.2016.2605380> (12 pages).

* cited by examiner

OVERSHOOTER DETECTION IN A RADIO NETWORK BASED ON RESTRICTION OF DATA TRAFFIC

CROSS-REFERENCE TO RELATED APPLICATIONS

This application is a national phase entry of and claims priority to International Patent Application No. PCT/FI2023/050640 (filed 21 Nov. 2023), which claims priority to Finnish Patent Application No. 20226052 (filed 25 Nov. 2022), the entire disclosures of which are incorporated by reference herein.

TECHNICAL FIELD

Various example embodiments generally relate to the field of wireless communications. Some example embodiments relate to detection of overshooting cells in a wireless communication network.

BACKGROUND

Wireless communication may be implemented with a cellular radio network comprising transmission sites that offer communication services via multiple cells corresponding to certain geographical coverage areas. Because of free propagation of radio signals, coverage areas of cells may overlap and therefore signals from different transmission sites may cause interference.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments of the present disclosure enable to reduce inter-cell interference within a cellular radio network. This benefit may be achieved by the features of the independent claims. Further example embodiments are provided in the dependent claims, the description, and the drawings.

According to a first aspect, a computer-implemented method is disclosed. The method may comprise: communicating data traffic via a first cell of a first access node of a communication network, wherein a sector of the first access node comprises the first cell and a second cell of the first access node; restricting amount of data traffic communicated via the first cell; and determining that a third cell of a second access node is overshooting, in response to determining, after restricting the amount of data traffic communicated via the first cell, that at least part of the data traffic is communicated via the third cell and not via the second cell.

According to an example embodiment of the first aspect, restricting the amount of data traffic communicated via the first cell comprises terminating communication of the data traffic via the first cell.

According to an example embodiment of the first aspect, the method comprises: determining that at least part of the data traffic is communicated via the third cell and not via the second cell, in response to detecting a statistical increase of timing advance values of the third cell and/or a statistical decrease of received signal strength values of the third cell.

According to an example embodiment of the first aspect, the first cell and the third cell are associated with a first frequency band and wherein the second cell is associated with a second frequency band, wherein the first frequency band is higher than the second frequency band.

According to an example embodiment of the first aspect, the first frequency band comprises an 1800 MHz frequency band, and wherein the second frequency band comprises an 800 MHz frequency band.

According to an example embodiment of the first aspect, a priority of the third cell for the data traffic is higher than a priority of the second cell for the data traffic.

According to an example embodiment of the first aspect, the amount of data traffic communicated via the first cell is restricted during an expected period of low data traffic or in response to determining that a total amount of data traffic of a plurality of cells of the communication network is below a threshold.

According to an example embodiment of the first aspect, the expected period of low data traffic is between 1 a.m. and 6 a.m.

According to an example embodiment of the first aspect, the method comprises: causing downtilting of at least one antenna of the third cell, in response to determining that the third cell is overshooting.

According to an example embodiment of the first aspect, the method comprises: monitoring at least one performance indicator of the third cell and/or at least one other cell of the communication network; and causing uptilting of the at least one antenna of the third cell, in response to determining, based on the at least one performance indicator, that the downtilting of the at least one antenna of the third cell caused a degradation in performance of the communication network.

According to an example embodiment of the first aspect, the at least one performance indicator comprises a channel quality indicator, a spectral efficiency, a change in amount of data traffic, or a number of dropped calls of the third cell and/or the at least one other cell of the communication network.

According to an example embodiment of the first aspect, the method comprises: outputting an indication of the third cell being overshooting.

According to an example embodiment of the first aspect, the indication of the cell being overshooting comprises an automated service ticket.

According to an example embodiment of the first aspect, the method comprises: selecting or prioritizing a subset of access nodes of the communication network for determining whether at least one cell of the communication network is overshooting, wherein the selection or prioritization of the subset of access nodes is based on at least one of the following: a cell range of the subset of access nodes, wherein access nodes having a lower cell range are selected or prioritized over access nodes having a higher cell range, each of the subset of access nodes including a cell associated with the first frequency band and a cell associated with the second frequency band, or a number of samples for determining the statistical increase of timing advance values of the third cell and/or the statistical decrease of received signal strength values of the third cell.

According to an example embodiment of the first aspect, coverage areas of the first cell and the second cell are located substantially at same direction from the first access node.

According to an example embodiment of the first aspect, the method comprises: partially powering down the first access node, when restricting the amount of data traffic communicated via the first cell.

According to a second aspect, an apparatus may comprise means for performing any example embodiment of the method of the first aspect.

According to a third aspect, computer program or a computer program product may comprise program code configured to, when executed by a processor, cause an apparatus at least to perform any example embodiment of the method of the first aspect.

According to a fourth aspect, an apparatus may comprise at least one processor; and at least one memory including computer program code; the at least one memory and the computer code configured to, with the at least one processor, cause the apparatus at least to perform any example embodiment of the method of the first aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
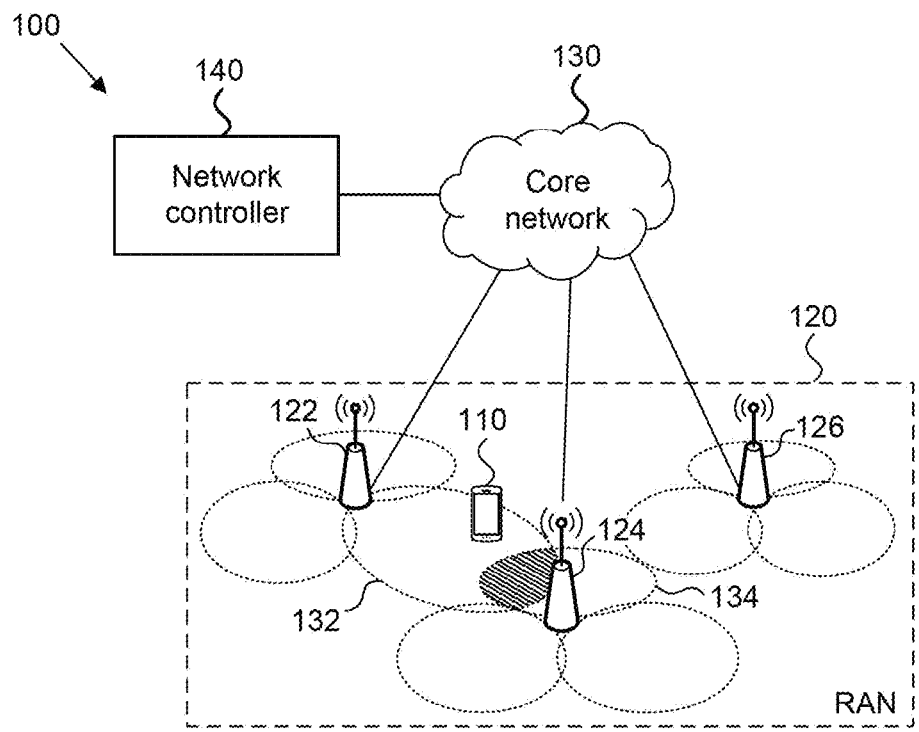
FIG. 1 illustrates an example of a wireless communication network.

FIG. 1 illustrates an example of a wireless communication network. Communication network 100 may comprise one or more devices, which may be also referred to as client nodes, user nodes, or user equipment (UE). An example of a device is UE 110, which may communicate with one or more access nodes of a radio access network (RAN) 120. Signals transmitted by an access node to UE 110 may be referred to as downlink signals. Signals transmitted by UE 110 to an access node may be referred to as uplink signals. An access node may be also referred to as an access point or a base station. Communication network 100 may be configured for example in accordance with the $4^{th}$ or $5^{th}$ generation (4G, 5G) digital cellular communication networks, as defined by the $3^{rd}$ Generation Partnership Project (3GPP). In one example, communication network 100 may operate according to 3GPP (4G) LTE (Long-Term Evolution) or 3GPP 5G NR (New Radio). Communication network 100 may hence comprise a cellular radio network. It is however appreciated that example embodiments presented herein are not limited to these example networks and may be applied in any present or future wireless communication networks, or combinations thereof, for example other type of cellular networks, short-range wireless networks, multicast networks, broadcast networks, or the like. Access nodes 122, 124, 126 of RAN 120 may for example comprise $5^{th}$ generation access nodes (gNB) or $4^{th}$ generation access nodes (eNodeB).

An access node may provide communication services within one or more cells, illustrated with dotted circles, which may correspond to geographical area(s) covered by signals transmitted by the access node. Dominance area of a cell may comprise is a physical (geographical) area in which certain cell has the strongest signal level among different cells. Handover between cells may be performed when UE 110 is at or near the border of the dominance area. Coverage areas of cells may overlap to some extent, for example to facilitate smooth handover for a mobile UE. Serving cell of a UE may be changed when another cell has the strongest signal level. Even though some overlapping may be useful for handover purposes, it may be generally desired to minimize the signal level outside the dominance area. Excessive overlapping between cells may cause unnecessary interference and hence degrade performance of the network, for example in terms of achievable data rate.

A cell may be determined to be overshooting if its signal level remains high also outside its dominance area. Overshooting may occur for example due to wrong antenna tilting. It may be desired to effectively detect overshooting cells such that corresponding counteraction(s) (e.g. antenna downtilting) may be performed. In the example of FIG. 1, coverage area of cell 132, served by access node 122, extends near access node 124, thereby causing interference deep within the coverage area of cell 134. Cell 132 may be considered to be overshooting, because its coverage area extends unnecessarily far. Example embodiments of the present disclosure enable overshooter detection based on monitoring data traffic within multiple cells, when restricting amount of data traffic in one of the cells. The network topology may be temporarily "broken", for example by intentionally turning off one cell, and information from the surrounding network, such as for example timing advance values or received signal strength values, may be utilized for detecting overshooting cells.

Communication network 100 may further comprise a core network 130, which may comprise various network functions (NF) for establishing, configuring, and controlling data communication sessions of users, for example UE 110. The data communication sessions may carry data traffic, for example application data associated with one or more applications running on UE 110. Communication network 100 may further comprise a network controller 140, which may be responsible of configuring various operations of RAN 120 and/or core network 130. Even though illustrated as a separate entity, network controller 140 may be also embodied as part of core network 130. Even though some operations have been described as being performed by network controller 140, it is understood that similar functions may be performed alternatively by other network device(s) or network function(s) of communication network 100. One task of network controller 140 may be to detect overshooting cells, such as cell 132, within RAN 120. Network controller 140 may be also configured to remotely control antenna tilts of access node, for example to downtilt antenna(s) of overshooting cells.

Figure 2:
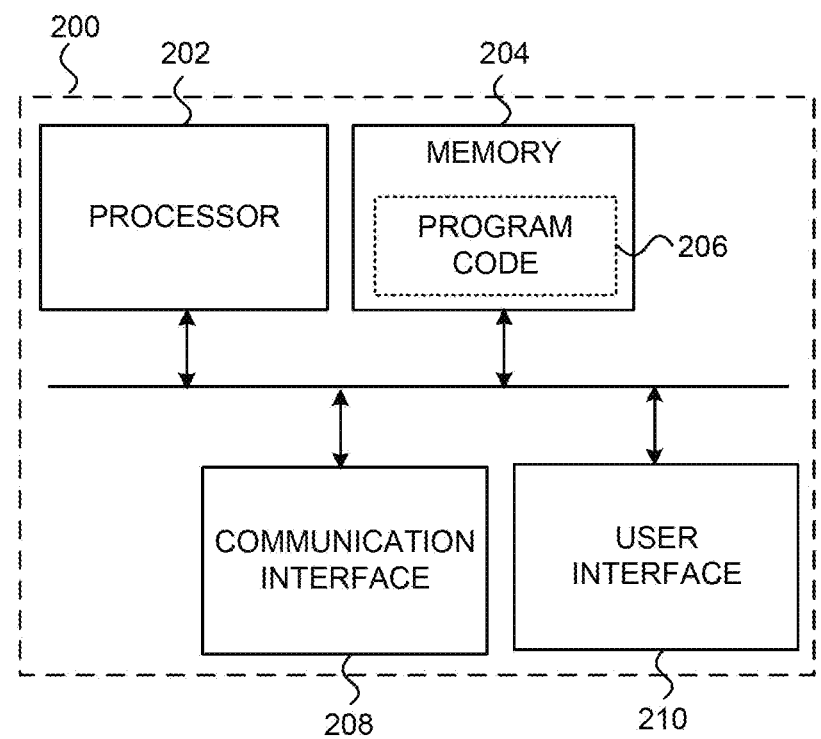
FIG. 2 illustrates an example of an apparatus configured to practice one or more example embodiments.

FIG. 2 illustrates an example embodiment of an apparatus 200 configured to perform one or more example embodiments. Apparatus 200 may be for example used to implement network controller 140. Apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise a communication interface 208 configured to enable apparatus 200 to transmit and/or receive information to/from other devices, functions, or entities. In one example, apparatus 200 may use communication interface 208 to transmit or receive information over a service based interface (SBI) message bus of core network 130, for example to core network 130 and/or RAN 120 about detected overshooting cells, to output indication(s) of the detected overshooting cells to a human user or an automated service ticket system, or to provide network configuration instructions (e.g. for remote antenna tilting) to RAN 120 to prevent or reduce overshooting in one or more cells. Apparatus 200 may further comprise a user interface, for example for configuring apparatus 200 or for providing user output by the apparatus, such as for example visual and/or audible signal(s), for example by speaker(s), display(s), light(s), or the like.

When apparatus 200 is configured to implement some functionality, some component and/or components of apparatus 200, such as for example the at least one processor 202 and/or the at least one memory 204, may be configured to implement this functionality. Furthermore, when the at least one processor 202 is configured to implement some functionality, this functionality may be implemented using program code 206 comprised, for example, in the at least one memory 204.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 200 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 200 comprises means for performing at least one method described herein. In one example, the means comprises the at least one processor 202, the at least one memory 204 including program code 206 configured to, when executed by the at least one processor, cause the apparatus 200 to perform the method.

Apparatus 200 may comprise a computing device such as for example an access point, a base station, a server, a network device, a network function device, or the like. Although apparatus 200 is illustrated as a single device it is appreciated that, wherever applicable, functions of apparatus 200 may be distributed to a plurality of devices, for example to implement example embodiments as a cloud computing service.

Figure 3:
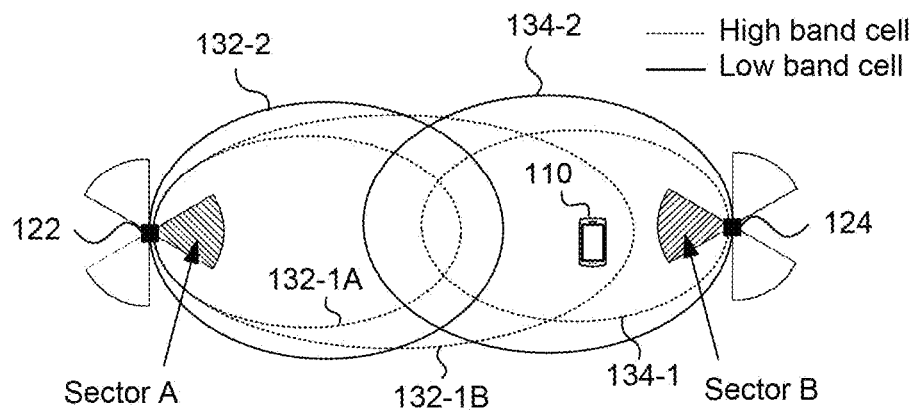
FIG. 3 illustrates an example of two access nodes, each communicating data traffic with two cells within same sector.

FIG. 3 illustrates an example of two access nodes, each communicating data traffic with two cells within same sector. Access node 124, which may be also referred to as a first access node, may comprise cells 134-1 and 134-2, which are illustrated in terms of their dominance areas. These cells may be also referred to as first and second cells, respectively. Cells 134-1 and 134-2 may belong to same sector (Sector B). Cells 134-1 and 134-2 may be therefore located substantially at the same direction from access node 124. A sector may comprise a certain angular range from an access node, for example 120°. An access node may comprise a plurality of sectors, for example three sectors as illustrated in FIG. 3. Cells 134-1 and 134-2 may be associated with different frequency bands, for example to substantially prevent interference between signals of cells 134-1 and 134-2. As an example, cell 134-1 may be configured to communicate data traffic at a first frequency band (e.g., 1800 MHz band). Cell 134-2 may be configured to communicate data traffic at a second frequency band (e.g., 800 MHz band). The first frequency band may be higher than the second frequency band. Cell 134-1 may therefore comprise a high band cell and cell 134-2 may comprise a low band cell. It is however noted that substantially interference less communication at cells of the same sector, for example cells 134-1 and 134-2, may be implemented with any suitable method, such as for example code division multiplexing (CDMA) between the cells, for example by assigning different code spaces for the cells.

Access node 122, which may be also referred to as a second access node, may comprise cells 132-1 and 132-2. Cell 132-1 is illustrated in terms of its dominance area 132-1A and coverage area 132-1B. Cell 132-2 is illustrated in terms of its dominance area. Cells 132-1 and 132-2 may belong to same sector (Sector A). Cells 132-1 and 132-2 may be therefore located substantially at the same direction from access node 122. Cells 132-1 and 132-2 may be associated with different frequency bands, for example similar to cells 134-1 and 134-2 of access node 124. Cell 132-1 may be configured to communicate data traffic at the first frequency band (e.g., 1800 MHz band). Cell 132-2 may be configured to communicate data traffic at the second frequency band (e.g., 800 MHz band). Cell 132-1 may therefore comprise a high band cell and cell 132-2 may comprise a low band cell. Cell 132-1 or cell 132-2 may be referred to as a third cell.

In the example of FIG. 3, communication of data traffic may be ongoing normally at cell 134-1, for example the amount of data traffic may not be restricted at this time (e.g., during daytime). UE 110 may be served by cell 134-1 in this situation. For example, data traffic of UE 110 may be communicated via cell 134-1. However, coverage area 132-1B of cell 132-1 extends deep within dominance areas of cells 134-1 and 134-2, thereby causing interference to UE 110. Cell 132-1 may be therefore considered to be overshooting.

Figure 4:
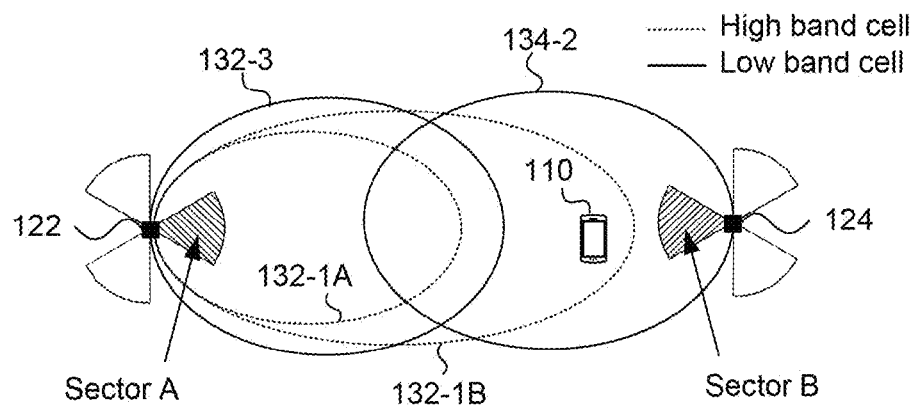
FIG. 4 illustrates an example of two access nodes, where communication of data traffic is restricted in one cell.

FIG. 4 illustrates an example of two, where communication of data traffic is restricted in one cell. In order to determine whether cell 132-1, or in general any cell of access node 122 or other access node(s), is overshooting, the amount of data traffic via cell 134-1 may be restricted, for example by locking cell 134-1 such that no data traffic is communicated via cell 134-1. For example, radio transceiver(s) or other equipment associated with cell 134-1 may be partially powered down or switched off completely. This not only enables overshooter detection, but it also reduces power consumption. In the example of FIG. 4, communication via cell 134-1 has been terminated and therefore cell 134-1 is not illustrated. If cell 132-1 is overshooting and therefore it has a high signal level, UE 110 may perform handover to cell 132-1 or 132-2 rather than cell 134-2. Furthermore, a priority of cell 132-1 or cell 132-2 may be higher than a priority of cell 134-2. Therefore, when the amount of data traffic communicated via cell 134-1 is restricted, UE 110 may have preference to perform handover from cell 134-1 to cell 132-1 or cell 132-2, rather than cell 134-2 of the same access node or sector. Performing overshooter detection by restricting data traffic at a cell of an access node may be therefore more effective when cells of other access node(s) are prioritized over cells of the same access node. For example, the influence on the data traffic moving to the other cells may be stronger and therefore easier to detect.

Restricting the amount of data traffic communicated via cell 134 may be performed for an expected period of low data traffic, e.g., when the amount of data traffic in communication network 110 is expected to be low, for example relative to the amount of data traffic during other periods of time. For example, the amount of data traffic may be restricted during nighttime, for example between 1 a.m. and 6 a.m. The amount of data traffic or (at least partial) powering down of access node 124 may be controlled by network controller 140. Alternatively, network controller 140 may monitor the amount of data traffic at cells (e.g., cells 132-1, 132-2, 134-1, and/or 134-2) of communication network 100 and restrict the amount of data traffic, for example in response to determining that a total amount of data traffic of the cells is below a threshold. Restricting the amount of data traffic in one cell during a period of low data traffic of communication network 100 enables overshooter detection to be performed without causing degradation in quality-of-service.

Figure 5:
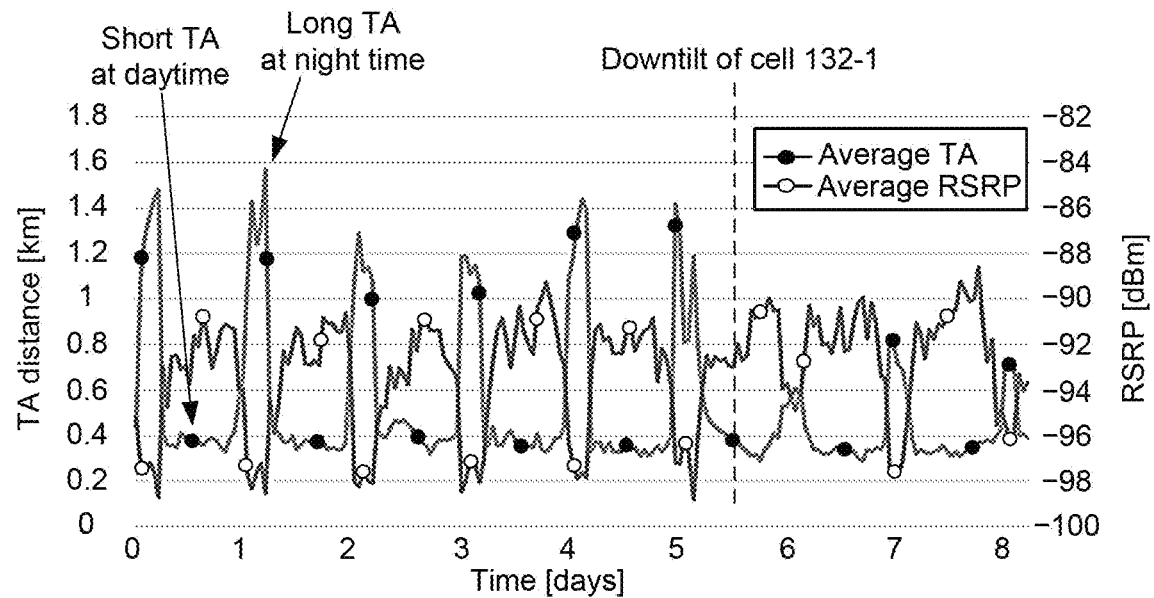
FIG. 5 illustrates an example of average timing advance distance and average received signal strength before and after downtilting an overshooting cell.

FIG. 5 illustrates an example of average timing advance distance and average received signal strength before and after downtilting an overshooting cell. Timing advance may be used in communication network 100 to synchronize transmission and reception between a UE and an access node such that the propagation time of the signal over a particular distance between the UE and the access node is compensated. Timing advance values may therefore correlate with distances of UEs from the access node and the same applies also to received signal strength due to propagation loss. In this example the received signal strength is represented by reference signal received power (RSRP). Network controller 140 may for example calculate hourly levels for key performance indicators (KPI), such as for example received signal strength (at the access node) and the timing advance (TA), which may be translated to a TA distance. The hourly KPI levels may be used for monitoring performance of communication network 100.

In the example of FIG. 5, which illustrates the TA and RSRP levels for cell 132-1, the amount of data traffic communicated via cell 134-1 is restricted during nighttime. This results in increase of the average timing advance distance at cell 132-1 during the restriction. This may happen because UEs located at dominance area of cell 134-1 move to cell 132-1, which is overshooting. The RSRP of cell 132-1 decreases during the restriction, because access node 122 receives the signals over a longer average distance. It is therefore possible to determine, based on the timing advance values or the received signal strength values, that data traffic has moved from cell 134-1 to cell 132-1 and that cell 132-1 is overshooting, as will be further described below with reference to FIG. 6. For example, network controller 140 may calculate an average TA distance for power saving hours (e.g. 1 a.m.-6 a.m.), and non-power saving hours (6 a.m.-1 a.m.). Based on the difference of the TA distance between these two time periods, network controller 140 may determine whether cell 132-1, or in general a third cell, is overshooting.

In response to detecting cell 132-1 to be overshooting, the antenna of cell 132-1 may be downtilted, as will be further described with reference to FIG. 7. This causes coverage area of cell 132-1 to be reduced such that it no longer extends to, or at least not as deep within, the dominance area of cell 134-1. Network controller 140 may determine to downtilt antenna of cell 132-1 for example if the ratio between the average TA distance at nighttime (data traffic restricted) and the average TA distance at daytime (data traffic not restricted) is over a threshold. This may be implemented for example based on the following pseudocode, where n is the threshold:

```
if (average_distance_night/average_distance_day > n)
        cause downtilt;
end
```

The threshold (n) for the ratio between the average TA distance when the amount of data traffic restricted and the average TA distance when the amount of data traffic is not restricted may be for example equal to or less than 2.5 (n≤2.5).

Alternatively, or additionally, network controller 140 may cause downtilting, in response to determining that difference between the average RSRP values between nighttime and daytime is above a threshold, for example m dB. This may be implemented for example based on the following pseudocode, where m is the threshold:

```
if (average_RSRP_night − average_RSRP_day > m)
        cause downtilt;
end
```

The threshold (m) for the difference between the average RSRP when the amount of data traffic restricted and the average RSRP when the amount of data traffic is not restricted may be for example 3-6 dB. Nighttime is herein used to represent a period of time when data traffic at cell 134-1 is restricted. Day time is used to represent a period of time when data traffic at cell 134-1 is not restricted. The above implementations may be generalized to any suitable time periods associated with low and high amounts of data traffic. The above criteria for TA distance and/or received signal strength may be also monitored periodically, for example daily, and the decision on the downtilting, or determination whether the cell is overshooting, may be made based on the number of observation periods where the threshold(s) are exceeded. For example, if the ratio average_distance_night_average_distance_day exceeds the threshold n on M days during an observation period of N days, network controller 140 may determine to cause the downtilt. In one example, M=5 and N=7.

It can be observed from FIG. 5 that the variance between daytime and nighttime for the TA or RSRP values is reduced after the downtilt. Based on this, network controller 140 may determine that overshooting was successfully reduced with the downtilt.

Figure 6:
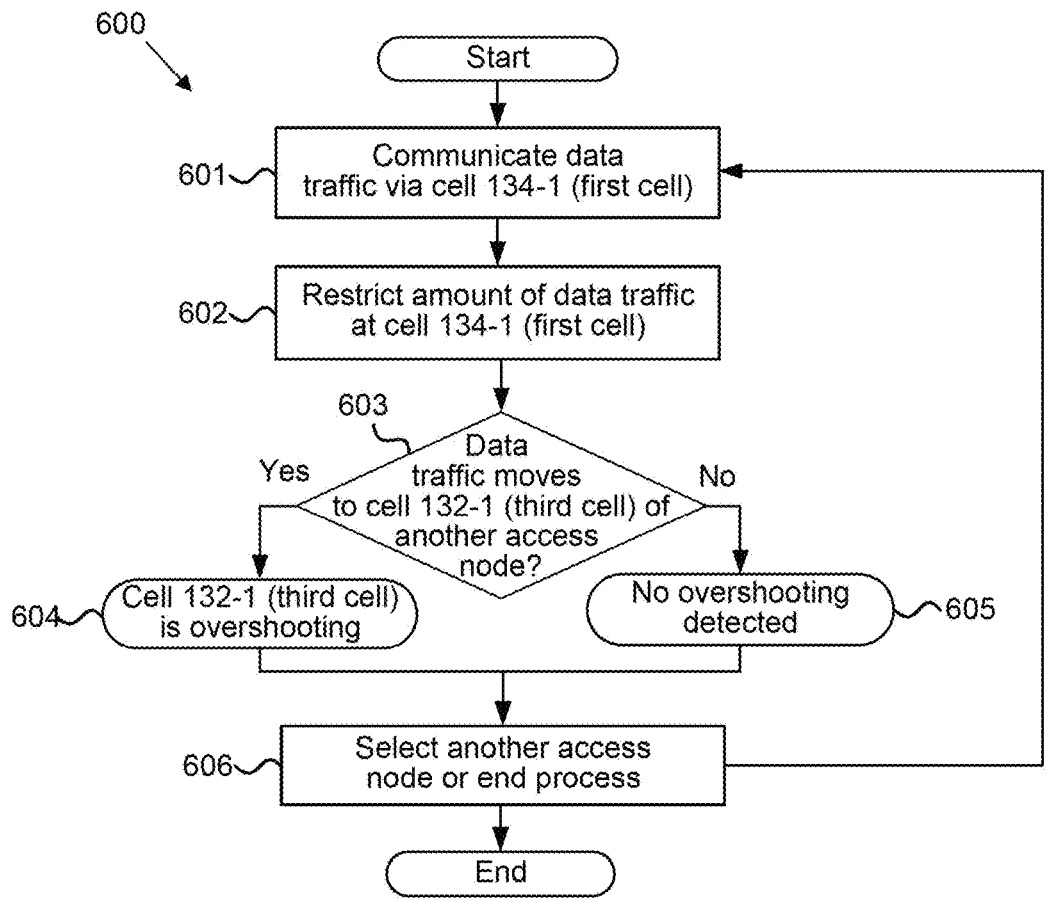
FIG. 6 illustrates an example of a flow chart for overshooter detection.

FIG. 6 illustrates an example of a flow chart for overshooter detection. Operations of flow chart 600 may be performed for example by network controller 140 and/or core network 130.

At operation 601, data traffic may be communicated via cell 134-1. Data traffic may be communicated to/from UEs, for example UE 110, located within coverage area of cell 134-1, but primarily within its dominance area.

At operation 602, network controller 140 may restrict the amount of data traffic communicated via cell 134-1, as discussed above. Restricting the amount of data traffic communicated via cell 134-1 may for example comprise terminating communication of the data traffic via cell 134-1. It is however possible that transmission of signaling data or reference signals continues after termination of the data traffic or that some amount of data traffic is still communicated during the restriction.

At operation 603, network controller 140 may determine, after the restriction of the amount of data traffic at operation 602, whether data traffic has moved from cell 134-1 to cell 132-1, or in general to a third cell of another access node.

Cell 132-1 is used herein as an example of a third cell. As described above, network controller 140 may determine that data traffic has moved to cell 132-1 based on detecting an increase in TA values (e.g., their average) in cell 132-1 and/or a decrease in received signal strength values (e.g., their average) in cell 132-1. In general, any suitable statistical measure (e.g., average, median, or a percentile) of the TA values or received signal strength values may be used. Therefore, determining that after the restriction of the amount of data traffic at cell 134-1 at least part of the data traffic is communicated via cell 132-1 (and not cell 134-2 of the same sector) may be in response to detecting a statistical increase of TA values of cell 132-1 and/or a statistical decrease of received signal strength values of cell 132-1.

At operation 604, network controller 140 may determine that cell 132-1 is overshooting. This may be in response to determining at operation 603 that, after restricting the amount of data traffic communicated via cell 134-1, at least part of that data traffic is communicated via cell 132-1 (and not via cell 134-2). In response to detecting cell 132-1 to be overshooting, network controller 140 may output an indication of cell 132-1 being overshooting. The indication may comprise a visual and/or audible alert signal, or an automated service ticket, which may be configured to be presented to a human user for taking care of the overshooting. Network controller 140 may transmit an indication of the overshooting of cell 132-1 to another device or cause performance of a counteraction. For example, network controller 140 may initiate operations of flow chart 700 to downtilt antenna(s) of cell 132-1, or in general any overshooting cell. By efficient overshooter detection and enablement of repairing actions, either automatically or manually by a service man, overall network performance may be improved, since unnecessary interference between cells may be effectively avoided.

It is noted that after restricting the amount of data traffic at cell 134-1, network controller 140 may monitor the TA values and/or received signal strength values in more than one cells, for example neighboring cells of cell 134-1. The third cell may therefore comprise any of the monitored cells. Network controller 140 may also determine that there are more than one overshooting cell in the neighborhood of cell 134-1. In that case, there may be more than one third cell.

At operation 605, network controller 140 may determine that no overshooting has been detected in the neighborhood of cell 134-1, in response to determining at operation 603 that, after restricting the amount of data traffic communicated via cell 134-1, the data traffic of cell 134-1 has not moved to cell 132-1, for example based on determining the statistics of the timing advance values and/or received signal strength of cell 132-1 to maintain substantially constant.

At operation 606, network controller 140 may select another access node, in order to determine whether cells in the neighborhood of the other access node are overshooting. Alternatively, network controller 140 may determine to end overshooter detection, for example if overshooter detection has been already performed for all relevant access nodes.

Overshooter detection may be performed for all access nodes of communication network 100 or a subset of the access nodes. This may include restricting the amount of data traffic in one cell at a time and monitoring the timing advance and/or received signal strength values of the neighboring cells of the restricted cell. It is however noted that the amount of data traffic may be restricted in more than one cell in parallel, for example when the respective access nodes are located sufficiently far from each other.

Access nodes may be selected or prioritized for overshooter detection, for example in order to improve efficiency of overshooter detection. If a subset of access nodes is selected or prioritized for overshooter detection, the selection or prioritization may be based on at least one of the following:

1) Cell range of the subset of access nodes. Access nodes having a lower cell range may be selected or prioritized over access nodes having a higher cell range. For example, cell having a service area of 1 km (cell range) may have higher priority than a cell having a service area of 10 km. In general, low range cells may have higher probability of being overshooting than high range cells. Therefore, cells having a cell range lower than a threshold, for example 1 km, 3 km, 5 km, or 10 km, may be selected for overshooter detection. The threshold may be used to adjust computational complexity. For example, the number of iterations in flow chart 600 may be reduced, if network controller 140 decreases the cell range threshold for selecting the access nodes or cells for overshooter detection. Overshooter detection may be performed in the order of increasing cell range, which is an example of prioritizing low range cells. This increases effectivity of counteractions, because the cells having high probability of being overshooting are processed earlier. Note that in this case, the amount of data traffic may be restricted at neighboring cell(s) of the selected or prioritized access nodes, for example a neighboring cell located in the direction of sector of the cell for which overshooting detection is performed.

2) Each of the subset of access nodes including a cell associated with the first frequency band and a cell associated with the second frequency band. Network controller 140 may determine not to apply the restriction of the amount of data traffic in cells that do not have both a low band and a high band cell, because in that case it is natural that restricting the amount of data traffic would cause the data traffic to move to another access node. In this case, network controller 140 may select access nodes that has a sector with cells both on the first frequency band and the second frequency band. This improves overshooter detection, because network controller 140 may skip the cells for which the movement of data traffic may not be used as a basis for detecting overshooting.

3) A member of samples used for determining the statistical increase of timing advance values and or the statistical decrease of received signal strength values. Network controller 140 may determine to exclude a (third) cell for which the number of samples for determining the statistical increase of TA values and/or the statistical decrease of received signal strength values in that cell is below a threshold. The threshold for the number of samples may be for example 2500 samples/week (e.g., in case of 5G NR) or 20000 samples/week (e.g., in case of LTE). Hence, this cell may be excluded from the determination of whether that cell is overshooting. Network controller 140 may for example filter out access nodes for which the number of samples is below a threshold, sample_count <x. Network controller 140 may select a subset of access nodes for which the number of samples is above the threshold. This improves reliability of overshooter detection at network level.

Figure 7:
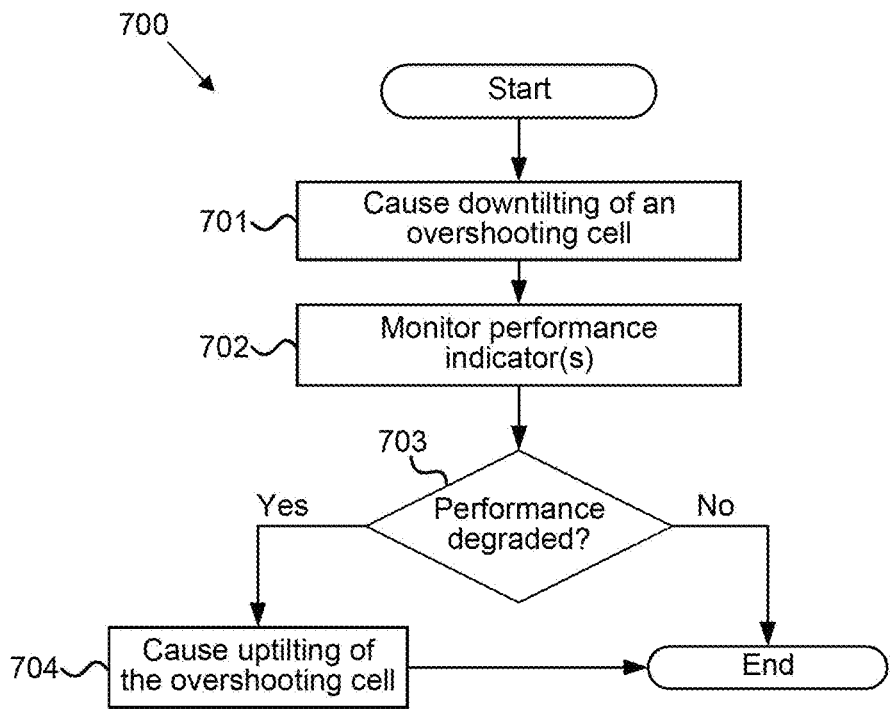
FIG. 7 illustrates an example of a flow chart for controlling antenna tilt of an overshooting cell.

FIG. 7 illustrates an example of a flow chart for controlling antenna tilt of an overshooting cell. Network controller 140 may initiate performance of flow chart 700, for example in response to detecting an overshooting cell (third cell) at operation 604. Cell 132-1 is again used as an example of such as cell.

At operation 701, network controller 140 may cause downtilting of cell 132-1. Downtilting of cell 132-1 may comprise downtilting of at least one antenna of cell 132-1, e.g., an antenna through which data traffic is communicated at cell 132-1. Downtilting may comprise directing the radiation pattern of the antenna downwards. This restricts the coverage area of signals communicated via the antenna. Network controller 140 may cause the downtilting by remotely controlling the antenna tilt of cell 132-1, or, by outputting an automated service ticket that triggers a service man to downtilt the antenna. Downtilting may be performed for one or more overshooting cells of communication network 100, for example one cell at a time such that performance of the network is monitored separately after each downtilt.

At operation 702, network controller 140 may monitor performance indicator(s) of communication network 100, for example performance indicators of cell 132-1 and/or its neighboring cell(s), such as for example cell 134-1 or 134-1. Monitoring the performance indicators may be used for checking that quality of service remains at least on the same level in cell 132-1 and cell(s) affected by its downtilting. Network controller 140 may monitor any suitable performance indicators, for example key performance indicators (KPI). The performance indicators may include one or more of the following: a channel quality indicator (CQI), spectral efficiency, a change in amount of data traffic, or a number of dropped calls of cell 132-1 and/or other cell(s) of communication network 100.

Figure 8:
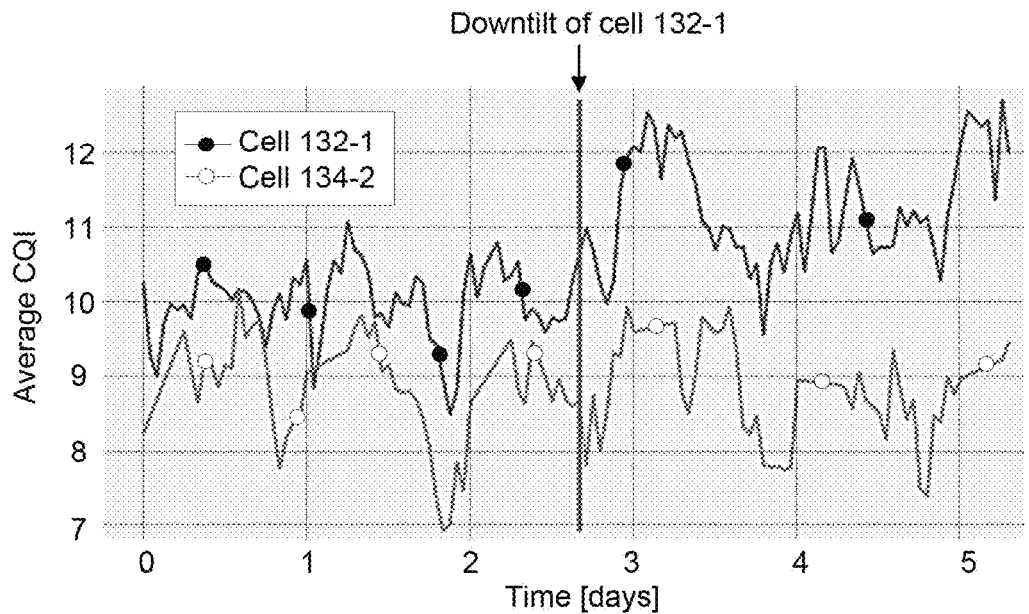
FIG. 8 illustrates an example of average channel quality indicator before and after downtilting an overshooting cell.

FIG. 8 illustrates an example of average CQI before and after downtilting an overshooting cell. CQI may indicate the most spectrally efficient modulation and coding scheme (MCS) applicable for achieving a certain error rate for given channel conditions. A low CQI may indicate poor radio performance while a higher CQI may indicate better radio performance. CQI may comprise an integer number (index), for example between 0 and 15. CQI may increase with increasing spectral efficiency of the associated MCS. UE 110 may be configured to estimate the CQI, for example based on reference signals received from an access node, and to report the CQI to the access node and/or core network 130. In the example of FIG. 8, the average CQI of the downtilted cell 132-1 and its most dominant neighboring cell in terms of coverage overlap (cell 134-2) are plotted. It is observed that the quality in terms of average CQI of the downtilted cell 132-1 is improved and that the quality is substantially maintained at the neighboring cell 134-2.

Figure 9:
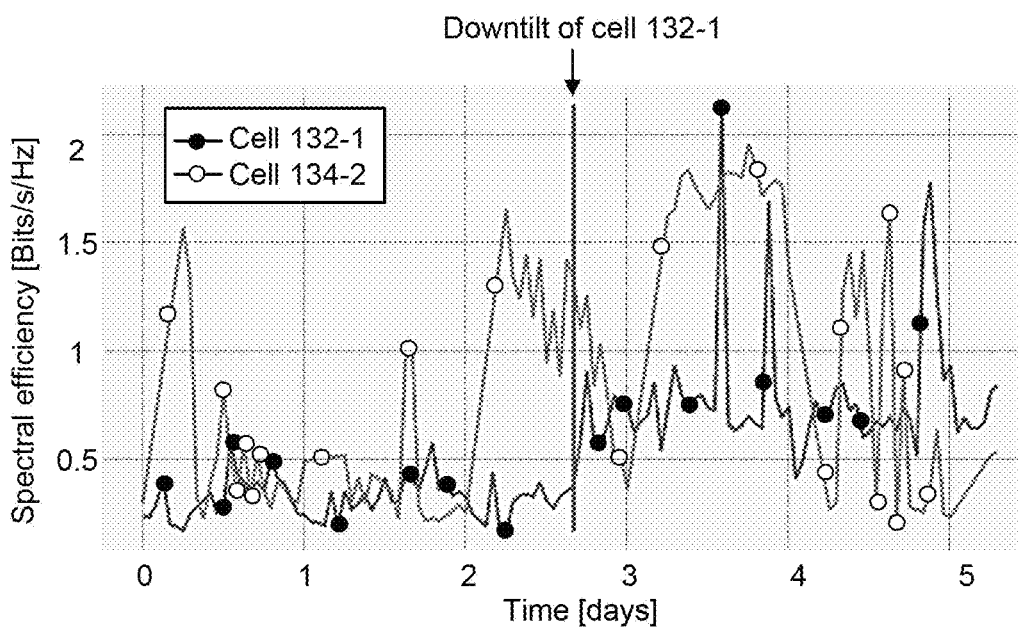
FIG. 9 illustrates an example of spectral efficiency before and after downtilting an overshooting cell.

FIG. 9 illustrates an example of spectral efficiency before and after downtilting an overshooting cell. Spectral efficiency is another performance indicator that can be used for monitoring performance of communication network 100. Spectral efficiency indicates the data rate of the data traffic, normalized by the bandwidth used for communicating the data traffic (bit/s/Hz). Spectral efficiency provides a measure of how efficiently the bandwidth is utilized in physical layer data transmission. It is observed that spectral efficiency of cell 134-2, which was previously suffering from the interference caused by overshooting of cell 132-1, is improved. Also the spectral efficiency of the downtilted cell 132-1 is improved.

Figure 10:
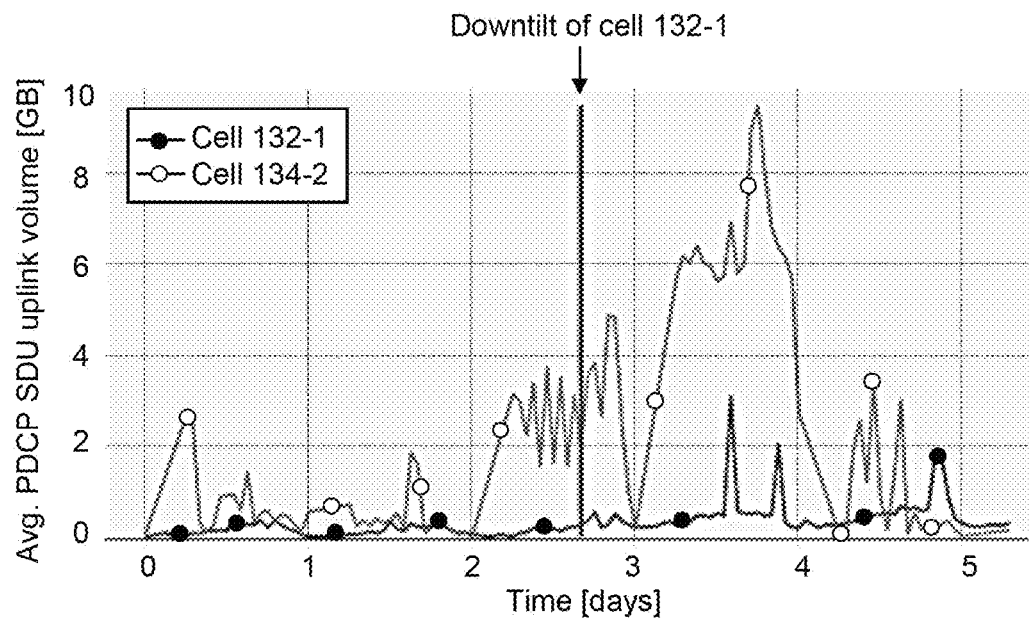
FIG. 10 illustrates an example of average data volume at uplink before and after downtilting an overshooting cell.
Figure 11:
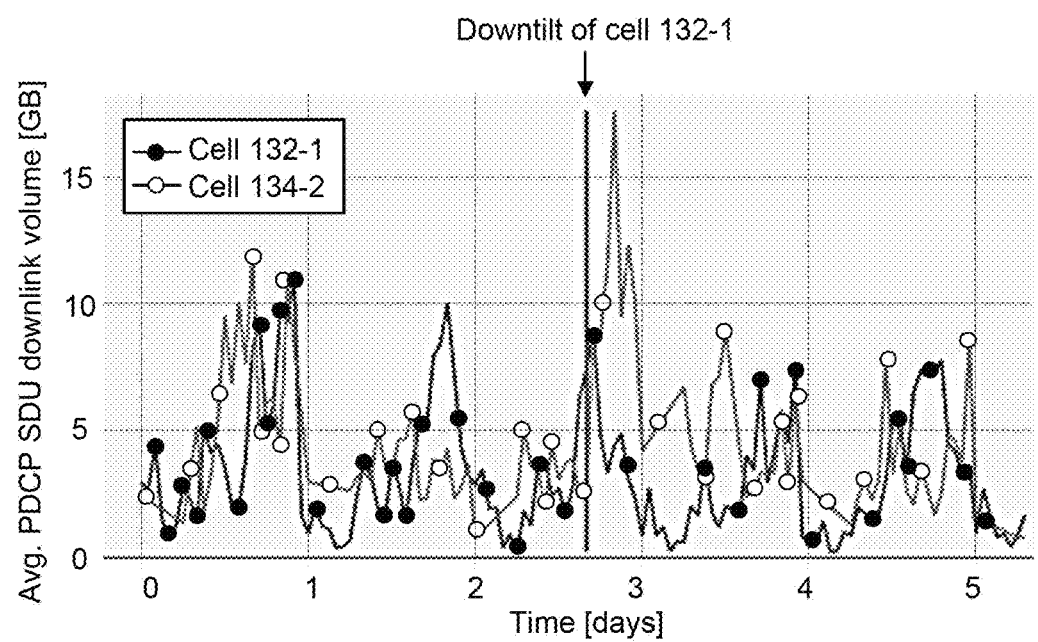
FIG. 11 illustrates an example of average data volume at downlink before and after downtilting an overshooting cell.

FIG. 10 and FIG. 11 illustrate examples of average data volume at uplink and downlink before and after downtilting an overshooting cell. The data volume (in gigabytes, GB) is plotted in terms of average packet data convergence protocol (PDCP) service data unit (SDU) volume. There is no major data traffic shift observed and the uplink data traffic of cell 134-2, affected by downtilting of cell 132-1, varies a lot. Downtilting may potentially reduce the coverage area or service area of the downtilted cell and therefore the volume (amount) of the data traffic may be reduced in the downtilted cell. However, if this happens (which may not always be the case), surrounding cells may take over and carry this data traffic, at least with the same quality. If downtilting reduces the volume of data traffic in both the downtilted cell and the surrounding cell(s), downtilting may be determined to have caused a coverage hole in the network. However, in many cases there may not be any significant traffic shift and only the quality is improved due to reduced interference. Therefore, if the total volume of data traffic does not change (e.g., reduce) significantly (e.g., more than a threshold volume of data traffic) in the downtilted cell and its neighboring cell(s), it may be determined that downtilting did not cause a degradation in performance of the network. If the total volume of data traffic changes (e.g., reduces) significantly in the downtilted cell and its neighboring cell(s), it may be determined that downtilting caused degradation in performance of the network. Antenna(s) of the downtilted cell may be then uptilted (rollback) to avoid the performance degradation.

Figure 12:
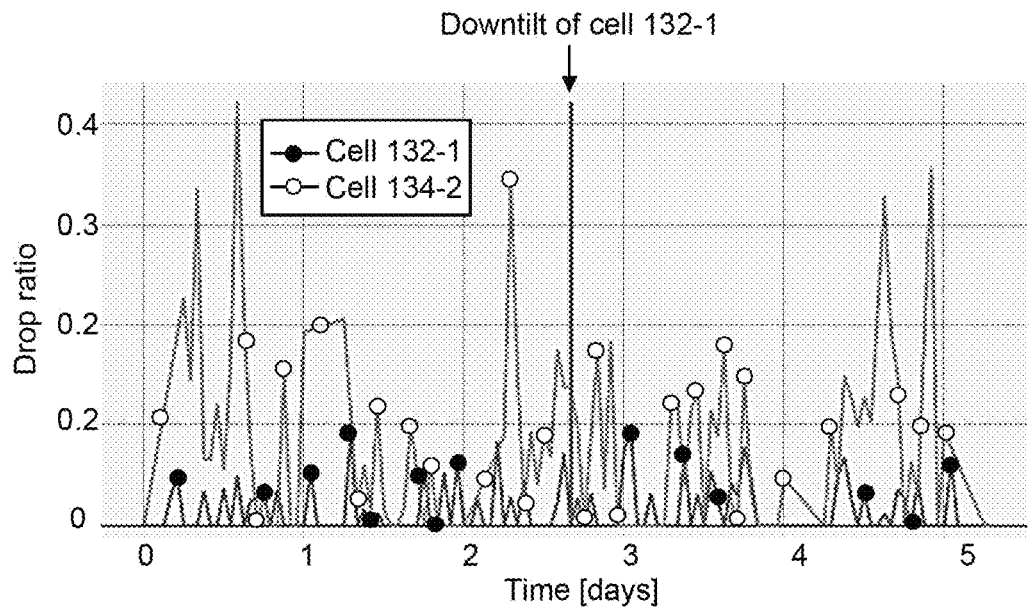
FIG. 12 illustrates an example of a dropped call ratio before and after downtilting an overshooting cell.
Figure 13:
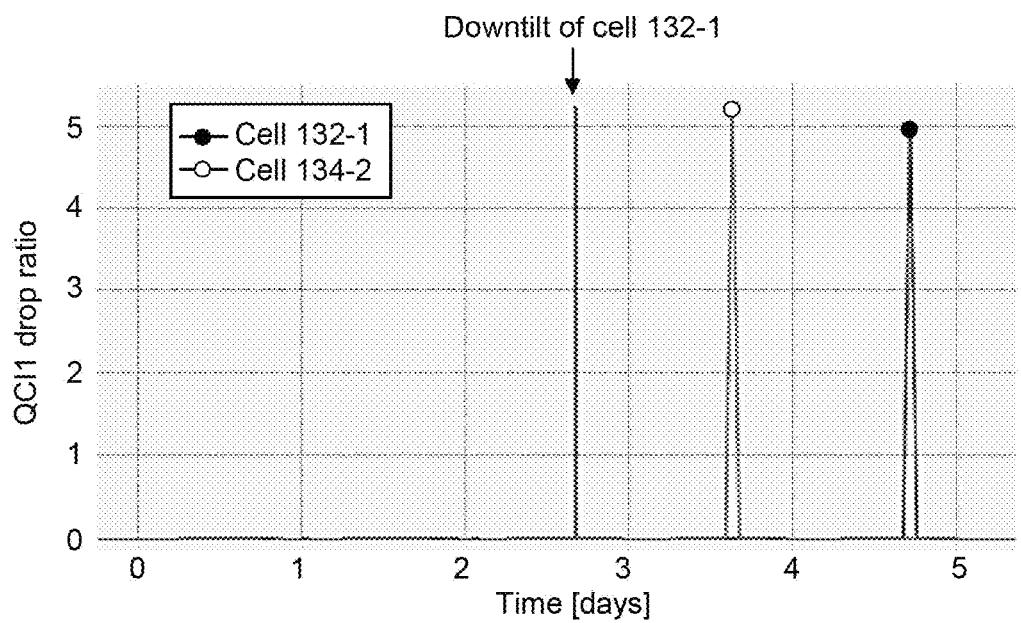
FIG. 13 illustrates an example of a dropped call ratio before and after downtilting an overshooting cell for a first class of quality of service (QCI1)

FIG. 12 and FIG. 13 illustrates examples of a dropped call ratios before and after downtilting an overshooting cell for all dropped calls and for a dropped calls associated with a quality-of-service class indicator equal to one (QCI1). It is observed that the downtilting does not cause any major changes occur in the number of dropped calls.

Referring back to FIG. 7, at operation 703 network controller 140 may determine whether performance of communication network 100 was degraded by the downtilting of the overshooting cell (cf. operation 701). For example, if the average CQI of the downtilted cell or other cell(s) decreases, or decreases at least by a predefined amount (e.g. by one), network controller 140 may determine that performance of communication network 100 was degraded by the downtilting. Also, if the spectral efficiency of the downtilted cell or other cell(s) decreases, or decreases at least by a predefined amount (e.g. by 0.3 bits/s/Hz), network controller 140 may determine that performance of communication network 100 was degraded by the downtilting. Similarly, if network controller 140 detects a major data traffic shift between cells or an increase in the number of dropped calls, it may determine that performance of communication network 100 was degraded by the downtilt. In response to determining that downtilting of the antenna(s) of the overshooting cell caused a degradation in the performance of communication network 100, network controller 140 may move to execution of operation 704, for example to take back the downtilt of operation 701.

If network controller 140 does not detect a performance degradation, or detects an improvement in the performance, it may end the procedure and determine to keep the downtilt caused at operation 701. For example, based on the performance indicators of FIG. 10 to FIG. 13, network controller 140 may determine to end the procedure because the performance indicators do not indicate a performance degradation.

At operation 704, network controller 140 may cause uptilting of antenna(s) of the overshooting cell. For example, network controller 140 may cause the antenna(s) to be uptilted such that the downtilt of operation 701 is reversed. This enables restoration of the state of communication network 100 as it was before the downtilt. Alternatively, network controller 140 may cause the uptilt to be performed progressively, for example such that the antenna(s) are uptilted in step(s) that are smaller than the downtilt. In response to completion of an uptilting step, network controller 140 may determine whether the performance of communication network 100 is still on a lower level compared to the performance before the downtilt. If yes, network controller 140 may cause another uptilting step. If not, network controller 140 may end the process and determine to keep the current antenna tilt. This enables optimization of the antenna tilt of the overshooting cell.

Figure 14:
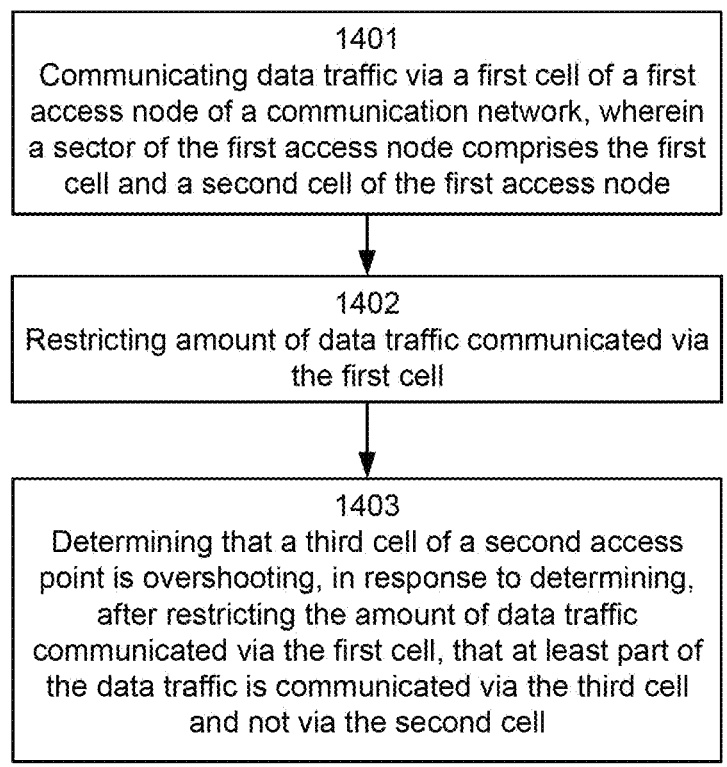
FIG. 14 illustrates an example of a method for detecting overshooting cells in a radio network.

FIG. 14 illustrates an example of a computer-implemented method for detecting overshooting cells in a radio network.

At 1401, the method may comprise communicating data traffic via a first cell of a first access node of a communication network, wherein a sector of the first access node comprises the first cell and a second cell of the first access node.

At 1402, the method may comprise restricting amount of data traffic communicated via the first cell.

At 1403, the method may comprise determining that a third cell of a second access node is overshooting, in response to determining, after restricting the amount of data traffic communicated via the first cell, that at least part of the data traffic is communicated via the third cell and not via the second cell.

Further features of the method directly result for example from the functionalities of network controller 140 or in general apparatus 200, as described throughout the specification and in the appended claims, and are therefore not repeated here. Different variations of the method may be also applied, as described in connection with the various example embodiments.

An apparatus, such as for example a network device configured to implement one or more network functions or entities, may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s). In general, computer program instructions may be executed on means providing generic processing functions. Such means may be embedded for example in a computer, a server, or the like. The method(s) may be thus computer-implemented, for example based algorithm(s) executable by the generic processing functions, an example of which is the at least one processor 202.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A computer-implemented method, comprising:
   communicating data traffic via a first cell of a first access node of a communication network, wherein a sector of the first access node comprises the first cell and a second cell of the first access node;
   restricting amount of data traffic communicated via the first cell; and
   determining that a third cell of a second access node is overshooting, in response to determining, after restricting the amount of data traffic communicated via the first cell, that at least part of the data traffic is communicated via the third cell and not via the second cell.

2. The method according to claim 1, wherein restricting the amount of data traffic communicated via the first cell comprises terminating communication of the data traffic via the first cell.

3. The method according to claim 1, further comprising:
   determining that at least part of the data traffic is communicated via the third cell and not via the second cell, in response to detecting one or more of a statistical increase of timing advance values of the third cell or a statistical decrease of received signal strength values of the third cell.

4. The method according to claim 1, wherein the first cell and the third cell are associated with a first frequency band and wherein the second cell is associated with a second frequency band, wherein the first frequency band is higher than the second frequency band.

5. The method according to claim 4, wherein the first frequency band comprises an 1800 MHz frequency band, and wherein the second frequency band comprises an 800 MHz frequency band.

6. The method according to claim 1, wherein a priority of the third cell for the data traffic is higher than a priority of the second cell for the data traffic.

7. The method according to claim 1, wherein the amount of data traffic communicated via the first cell is restricted during an expected period of low data traffic or in response to determining that a total amount of data traffic of a plurality of cells of the communication network is below a threshold.

8. The method according to claim 7, wherein the expected period of low data traffic is between 1 a.m. and 6 a.m.

9. The method according to claim 1, further comprising:
   causing downtilting of at least one antenna of the third cell, in response to determining that the third cell is overshooting.

10. The method according to claim 9, further comprising:
    monitoring at least one performance indicator of one or more of the third cell or at least one other cell of the communication network; and
    causing uptilting of the at least one antenna of the third cell, in response to determining, based on the at least one performance indicator, that the downtilting of the at least one antenna of the third cell caused a degradation in performance of the communication network.

11. The method according to claim 10, wherein the at least one performance indicator comprises a channel quality indicator, a spectral efficiency, a change in amount of data traffic, or a number of dropped calls of one or more of the third cell or the at least one other cell of the communication network.

12. The method according to claim 1, further comprising:
    outputting an indication of the third cell being overshooting.

13. The method according to claim 12, wherein the indication of the cell being overshooting comprises an automated service ticket.

14. The method according to claim 1, further comprising:
    selecting or prioritizing a subset of access nodes of the communication network for determining whether at least one cell of the communication network is overshooting, wherein the selection or prioritization of the subset of access nodes is based on at least one of:
    a cell range of the subset of access nodes, wherein access nodes having a lower cell range are selected or prioritized over access nodes having a higher cell range,
    each of the subset of access nodes including a cell associated with a first frequency band and a cell associated with a second frequency band, or
    a number of samples for determining one or more of a statistical increase of timing advance values of the third cell or a statistical decrease of received signal strength values of the third cell.

15. The method according to claim 1, wherein coverage areas of the first cell and the second cell are located substantially at same direction from the first access node.

16. The method according to claim 1, further comprising:
    partially powering down the first access node, when restricting the amount of data traffic communicated via the first cell.

17. An apparatus comprising:
   at least one processor; and
   at least one memory including computer program code; the at least one memory and the computer program code configured to, with the at least one processor, cause the apparatus at least to:
      communicate data traffic via a first cell of a first access node of a communication network, wherein a sector of the first access node comprises the first cell and a second cell of the first access node;
      restrict amount of data traffic communicated via the first cell; and
      determine that a third cell of a second access node is overshooting, in response to determining, after restricting the amount of data traffic communicated via the first cell, that at least part of the data traffic is communicated via the third cell and not via the second cell.

18. A computer program product comprising program code configured to, when executed by a processor, cause an apparatus at least to:
   communicate data traffic via a first cell of a first access node of a communication network, wherein a sector of the first access node comprises the first cell and a second cell of the first access node;
   restrict amount of data traffic communicated via the first cell; and
   determine that a third cell of a second access node is overshooting, in response to determining, after restricting the amount of data traffic communicated via the first cell, that at least part of the data traffic is communicated via the third cell and not via the second cell.

19. The computer program product according to claim 18, wherein the computer program product includes at least one memory.

20. The computer program product according to claim 19, wherein the at least one memory includes one or more of a magnetic storage device, an optical storage device, or a semiconductor memory.

\* \* \* \* \*